United States Patent [19]

Dean

[11] 4,182,301
[45] Jan. 8, 1980

[54] ROTARY INTERNAL COMBUSTION ENGINE

[76] Inventor: Joe O. Dean, 5841 NE. 22nd Ave., Fort Lauderdale, Fla. 33308

[21] Appl. No.: 865,139

[22] Filed: Dec. 28, 1977

[51] Int. Cl.² ............................................. F02B 53/00
[52] U.S. Cl. ..................................... 123/246; 418/192; 418/264
[58] Field of Search ..................... 123/231, 232, 246; 418/9, 13, 191, 192, 264

[56] References Cited

U.S. PATENT DOCUMENTS

| | | | |
|---|---|---|---|
| 858,912 | 7/1907 | Rousseau | 123/246 X |
| 1,009,759 | 11/1911 | Liston et al. | 418/192 |
| 1,326,684 | 12/1919 | Newland | 418/192 X |
| 1,704,236 | 3/1929 | Zuccarello et al. | 123/246 |
| 3,323,499 | 6/1967 | Gijbeis | 123/246 X |
| 3,538,893 | 11/1970 | Tinsley | 123/246 |

FOREIGN PATENT DOCUMENTS 2538963  3/1977  Fed. Rep. of Germany ........... 123/246

Primary Examiner—Michael Koczo
Attorney, Agent, or Firm—Brady, O'Boyle & Gates

[57] ABSTRACT

A pair of counter-rotating rotors operate in communicating rotor chambers of a common rotor housing. The rotors are pocketed in their peripheries and alternating pockets of each rotor receive vane-piston rollers of the opposing rotor with the vane-piston rollers intermeshing during rotor rotation. The peripheral rotor pockets form secondary relatively high compression combustion chambers having a secondary fuel supply independent of the supply to a primary combustion space between the two rotors and adjacent eccentric wall portions of the rotor chambers. During engine operation, the vane-piston rollers constantly engage the chamber walls due to centrifugal force and are radially guided by central fixed cams. Four cycle piston engine operation is closely simulated and major virtues of rotary and reciprocating piston engine types are retained while major disadvantages of each engine type are eliminated in a hybrid engine.

11 Claims, 6 Drawing Figures

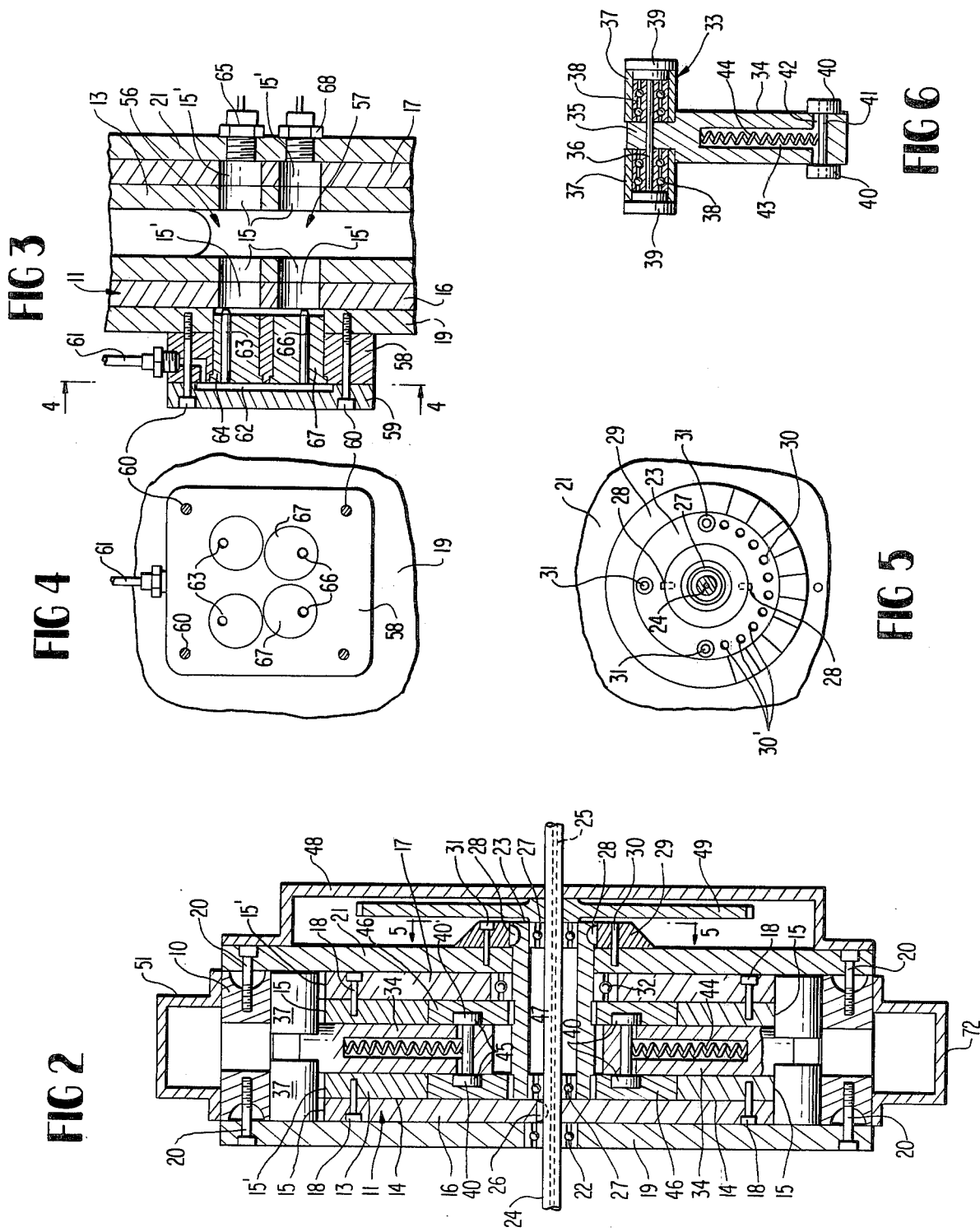

ROTARY INTERNAL COMBUSTION ENGINE

BACKGROUND OF THE INVENTION

Reciprocating piston internal combustion engines and various types of rotary engines are well known and their advantages and disadvantages are well known and widely discussed in the patented prior art. The general objective of the present invention is to provide an internal combustion engine which embodies the primary and inherent advantages of both engine types while eliminating the major disadvantages of both types in what may be termed a hybrid rotary engine. The engine, according to the invention, possesses the structural simplicity and comparative light weight characteristic of a rotary engine in conjunction with the greater efficiency and economy and clean burning ability of the relatively high compression reciprocating piston engine. The engine cycle is essentially that of the well-known four stroke cycle piston engine although in a rotary configuration. The engine is compact, durable and possesses an excellent power-to-weight ratio with the cleanest possible exhaust emission far exceeding that of conventional rotary engines.

A primary feature of the invention is the greatest possible reduction of friction in comparison to the prior art by the employment of anti-friction rolling contact elements at all critical points.

Another main feature of the invention is the provision of a primary combustion chamber or space and associated fuel and air induction means for the primary chamber, in combination with a secondary relatively high compression "piston-cylinder type" combustion chamber with independent fuel supply formed by rotating pockets in the peripheries of the two counter-rotating engine rotors and coacting intermeshing vane-piston rollers and cam guidance means on each engine rotor.

The above and many additional novel features of the invention will become apparent during the course of the following description taken in connection with the accompanying drawings.

BRIEF DESCRIPTION OF THE DRAWINGS

FIG. 2 is a vertical section taken centrally through one engine rotor on line 2—2 of FIG. 1.

FIG. 3 is a fragmentary vertical section, similar to FIG. 2 but at a radial plane through one rotor adjacent to secondary combustion fuel supply and igniter means.

FIG. 4 is a vertical section taken on line 4—4 of FIG. 3.

FIG. 5 is a similar section taken on line 5—5 of FIG. 2.

FIG. 6 is a central vertical section taken through one vane-piston roller assembly.

DETAILED DESCRIPTION

Figure 1:
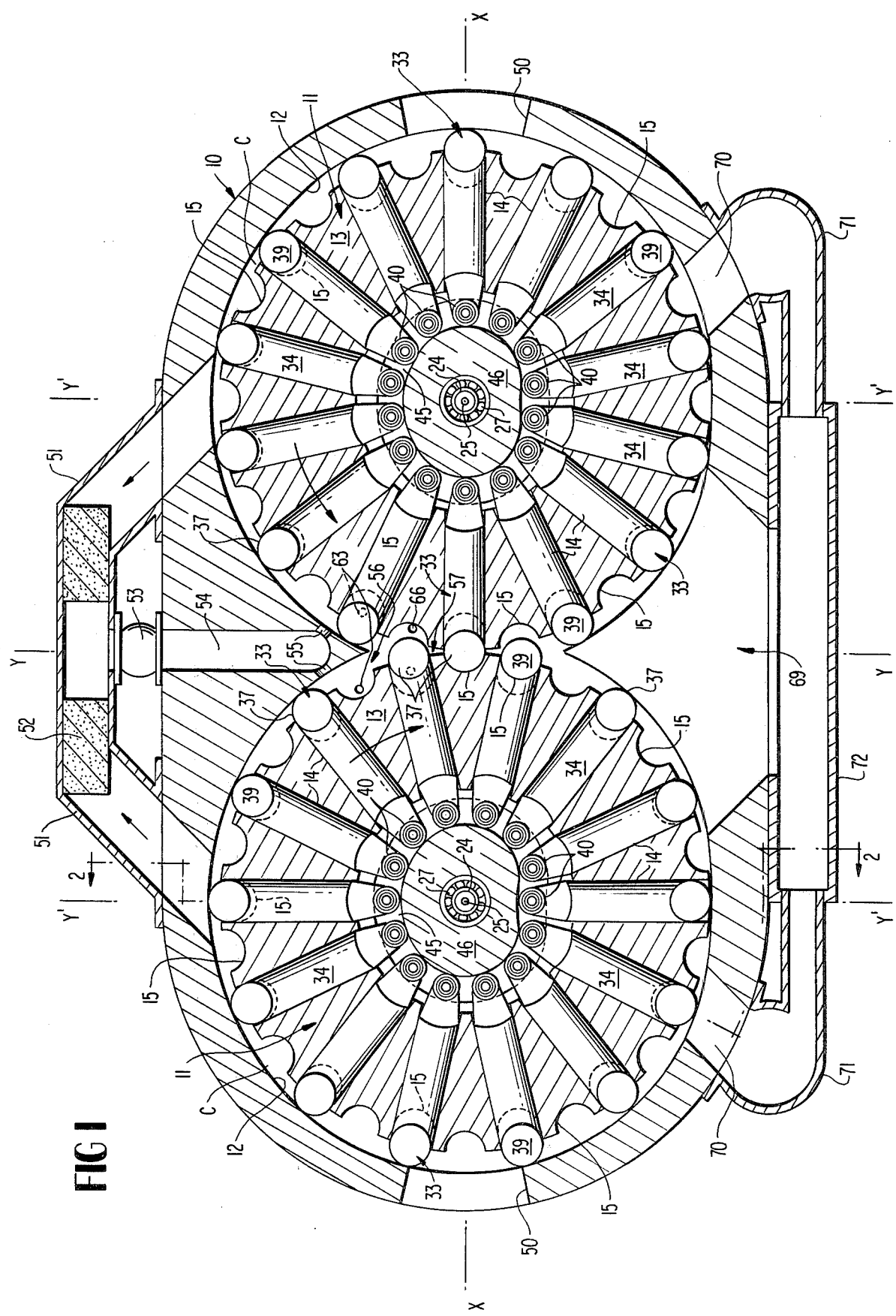
FIG. 1 is a vertical section taken through a rotary engine embodying the invention in a plane normal to the axes of rotation of the two counter-rotating engine rotors.

Referring to the drawings in detail wherein like numerals designate like parts, a rotary engine according to the invention comprises a single or common housing 10 for a pair of identical counter-rotating rotors 11 which are disposed operationally within side-by-side parallel axis communicating rotor chambers 12 of the housing 10. The engine rotors 11 are cylindrical and have equal diameters and parallel axes of rotation. The two rotors are substantially in tangent contact at the intersection of right angular coordinate axes X—X and Y—Y, FIG. 1. The two chambers 12 are somewhat oblong along the X—X axis and overlap for equal distances on opposite sides of the Y—Y axis, or point of tangency of the two rotors 11. The bottoms of the rotors 11 are nearly in contact with the lower wall portions of chambers 12 while their outer peripheral extremities on the X—X axis are spaced equidistantly from the chamber walls by an amount equal to the overlap of the chambers 12 along the X—X axis. The tops of the rotors 11 are spaced a somewhat lesser distance from the rotor chamber walls along the rotor axes Y'—Y'.

Referring primarily to FIG. 2, each rotor 11 comprises a rotor body 13 which is unitary and annular and provided with a plurality of circumferentially equidistantly spaced radial passages 14, for a purpose to be described. In the drawing illustration, fourteen of the radial passages are formed in each rotor 11. In the cylindrical periphery of each rotor 11, a plurality of circumferentially equidistantly spaced pockets or recesses 15 are formed and these pockets are equally sized and are twenty-eight in number on each rotor with alternate pockets 15 on each rotor lying midway between the radial passages 14 and the remaining pockets being formed in registration with the outer open ends of the passages 14.

Each rotor 11 additionally comprises a side drive plate 16 and an opposite side bearing support plate 17 secured fixedly to the rotor body 13 by screws 18 or the like. It may be noted in FIG. 2 that the semi-cylindrical pockets 15 are also formed in the plates 16 and 17 at 15'.

The engine housing 10 has a first side enclosing plate 19 secured thereto fixedly by screws 20 and a second side enclosing plate 21 secured thereto by additional screws 20. The plate 19 supports a rotor drive shaft frictionless bearing 22 and the plate 21 has a central bore receiving an axial cam track tube or shaft 23, to be further described. Each rotor 11 has a central axial drive shaft 24 including a lubrication passage 25 journaled in the bearing 22 and locked to the driving plate 16 by a Woodruff key 26. The shaft 24 is further supported and journaled in an axially spaced pair of frictionless bearings 27 held within the bore of cam track shaft 23. This latter shaft is locked by Woodruff keys 28 to a graduated adjusting dial 29 doweled at 30 to the housing side plate 21 and further secured thereto by screws 31, see FIG. 5. The use of the dial 29 will be further discussed hereinafter. A further anti-friction bearing 32 held within a bore of the rotor side plate 17 supports each rotor 11 rotationally. As may now be seen, during engine operation, rotor rotation within the stationary housing 10 produces rotation of each drive shaft 24 through the key 26. The cam track tube or shaft 23 does not turn with the rotor, being keyed at 28 to the adjusting dial 29 which in turn is secured to the housing side closure plate 21.

Each radial passage 14 of each engine rotor 11 and the pocket or recess 15 at the mouth thereof receives a low friction vane-piston roller assembly 33, one of which assemblies is shown in detail in FIG. 6. Each vane-piston assembly 33 comprises a radial piston body or stem 34 received closely and slidably in one of the passages 14. Each piston body 34 has a reduced head 35 at its outer end carrying a cross shaft 36 for the support of low friction cylindrical rollers 37 having integral frictionless bearings 38 and end retainer caps 39. As shown in the drawings, the cylindrical rollers 37 are seated in the pockets 15 at the mouths of the radial passages 14 and during counter-rotation of the two rotors 11, FIG. 1, the rollers 37 of one rotor 11 intermesh with the corresponding rollers of the other rotor as they approach and depart from the X—X axis. During such intermeshing, FIG. 1, the rollers 37 of each assembly 33 of one rotor 11 enter and then depart from the alternate unoccupied pockets 15 of the opposing rotor, and become fully engaged in the alternate pockets 15 on the X—X axis. The purpose of this engagement will be further discussed in connection with the description of operation of the engine. It should be noted in FIG. 2 that the rollers 37 of each assembly 33 also enter the pockets 15' of plates 16 and 17 as well as the pockets 15 of rotor body 13.

Each assembly 33 is additionally provided near the inner end of piston body 34 with cam track anti-friction bearings or rollers 40 mounted on a common cross shaft 41 disposed in an elongated opening 42 of the body 34. The shaft 41, with the two rollers 40, is biased by a spring 43 within a cavity 44 of the piston body 34 toward engagement with profiled tracks 45 formed in the interior faces of a pair of opposing cam track plates 46 adjustably held in each rotor body 13 between the plates 16 and 17 thereof.

The cam track plates 46 are splined at 47 to the tube or shaft 23 which is connected to the adjusting dial 29 in the manner previously described. The adjusting dial 29 forms a ready means for timing the engine during the operation thereof to obtain peak efficiency and power both in the main combustion chamber and in the revolving secondary combustion chambers 15 which coact with the vane-piston assemblies 33. With the accessory drive gear cover 48 and accessory drive gear 49 of each engine rotor removed, the adjustable timing dials 29 and their dowel pins and attaching screws 30 and 31 are accessible at one side of the dual rotor engine so that each dial can be rotated and locked in the proper adjusted position by engagement of the dowel pin 30 in one of a plurality of circumferentially spaced adjustment openings 30' provided in the timing dial. The dial is secured in the selected adjusted position by means of the screws 31. When the dial 29 is turned to make the timing adjustment, the tube 23 keyed to it at 28 also turns, and because of the splines 47, the cam track plates 46 turn and hence adjust the vane-piston assemblies 33 due to the profiles of the cam tracks 45.

The housing 10 is provided on the X—X axis at the outer peripheral faces of the rotors 11 with large unrestricted air intake ports 50 through which combustion air is inducted into eccentric diminishing width compression chambers C between the housing walls 12 and rotors 11. A manifold 51 having an annular filter 52 delivers air from the chambers C to a carburetor 53 which receives primary combustion fuel from a conventional source, not shown. This primary air-fuel mixture passes through a common intake passage 54 to branch intake ports 55 which deliver the air-fuel mixture simultaneously to a main or primary combustion chamber 56 between the upper portions of the two rotors 11 and the oncoming rollers 37 of the assemblies 33 which are held in engagement with the housing chamber walls by centrifugal force, initially aided by the springs 44. The main combustion chamber or cavity 56 is further defined by the full intermeshing of alternating pockets 15 and vane-piston assemblies 33 on the two rotors 11 along the X—X axis. When each assembly 33 is on dead center along the X—X axis, it may be seen that the main combustion chamber 56 becomes a closed chamber bounded by upper wall portions of the housing 10 between a pair of oncoming rollers 37 of the two rotors and one completely engaged or intermeshed roller 37 on one rotor with one pocket 15 of the opposing rotor.

As noted previously, a major feature of the invention is the provision in the engine of a secondary combustion means where the burning of fuel can be more complete due to higher compression, resulting in cleaner engine emissions and greater efficiency in terms of more usable power. Such secondary combustion chamber means is constituted by each oncoming rotor pocket 15 and one of the vane-piston assemblies 13 of the opposing rotor 11. The secondary combustion chamber thus begins to come into being near the bottom of the primary chamber 56, FIG. 1, where each roller 37 starts to enter a pocket 15 of the opposing rotor and fully enters such pocket on the X—X axis of the engine. More particularly, the engine secondary combustion chamber is shown at 57 in FIG. 1 between the partially engaged roller 37 and pocket 15 and the fully engaged roller and pocket on the X—X axis, it being understood that the elements forming the secondary combustion chamber 57 are constantly changing as the two rotors revolve in opposite directions and different pockets 15 and rollers 37 constantly move into meshing engagement and constantly separate below the X—X axis.

In conjunction with the primary and secondary combustion chambers 56 and 57, adjustable fuel injection means shown in FIGS. 3 and 4 are utilized. Referring to these figures, on the side plate 19, a fuel injection block 58 having a cover plate 59 secured by screws 60 is fixedly mounted. Liquid fuel, such as gasoline or diesel fuel, is delivered through a fuel line 61 to a chamber 62 of the fuel injection device. Within the block 58, one pair of adjustable injection nozzles 63 are held within rotationally adjustable eccentric holders 64 with the nozzles 63 in communication with the rotor pockets 15—15' which form a part of the primary combustion chamber 56. By adjusting the eccentric holders 64, the nozzles 63 are caused to inject fuel into the primary combustion space 56 at the most advantageous points in terms of engine timing and optimum burning efficiency. This primary injected fuel supplements the fuel-air mixture delivered into the primary combustion chamber 56 by the carburetor 53 and ports 55. The injection system enables the engine to operate optionally as a compression ignition engine, such as a diesel or semi-diesel, or with an electrical ignition system and spark plugs. For purposes of illustration, in FIG. 3, a glow plug 65 or equivalent ignition device is mounted on the side enclosing plate 21 so as to communicate with the moving pockets 15—15' of each rotor 11.

Similarly, fuel injection nozzles 66 for the secondary combustion space or chamber 57 are also provided in the block 58 and are held within rotationally adjustable eccentric holders 67 similar to the holders 64. The nozzles 66 thus may be adjusted to the optimum positions relative to the pockets 15—15' which make up the secondary combustion chamber 57 in concert with the oncoming vane-piston rollers 37. In connection with the roller elements 37, and the term "vane-piston" employed therewith, it will be understood that during counter-rotation of the rotors 11 the several anti-friction rollers 37 of the assemblies 33 roll on the walls of housing chambers 12 at all times under influence of centrifugal force with initial assistance from springs 44.

In the regions between the air intake ports 50 and the main combustion chamber 56, these rollers 37 function like the radial vanes of a rotary vane engine or turbine. However, in the region of the secondary higher compression combustion space 57 where the rollers 37 of the two rotors begin to intermesh and to enter the pockets 15, the rollers are functioning like the pistons in a piston type internal combustion engine, such as a compression ignition engine, semi-diesel or electrical ignition engine. Therefore, an apt term for the rollers 37 is "vane-piston" and the bodies 34 of the assemblies 33 are aptly termed "piston bodies" since they reciprocate radially in the rotor passages 14 under influence of the adjustable timing cam track plates 46.

When the rollers 37 are acting like vanes in a radial vane engine ahead of the primary combustion chamber 56, they are compressing the primary air-fuel mixture from the carburetor 53 to a comparatively low degree of compression prior to ignition. However, when the rollers 37 are functioning like the pistons of a reciprocating engine in concert with the rotor pockets 15 at the secondary combustion space 57, they are compressing the remaining unburned air-fuel charge from the primary chamber 56 to a much higher degree of compression in the secondary chamber 57 which reaches a maximum when each roller 37 fully enters the opposing pocket 15 on the axis X—X. Each time when this condition prevails the charge which is highly compressed in the pocket 15 including the additional fuel injected by adjustable nozzles 66 will be fired due to compression or with the assistance of another glow plug 68, or equivalent device, FIG. 3. Again, a virtue of the engine is its ability to operate with electrical ignition at one range of pressures or as a diesel or semi-diesel at higher pressures in the combustion spaces.

The exhaust system for the engine comprises a large exhaust port 69 on the Y—Y axis and common to the two engine rotors 11 so as to minimize exhaust back pressure. Auxiliary or scavenging exhaust ports 70 substantially midway between the main port 69 and intake ports 50 are formed in the housing 10 for delivering scavenging gases through scavenging manifolds 71 to opposite ends of a main exhaust manifold 72 which receives the main volume of the exhaust products through the large port 69. The scavenging gases from the manifolds 71 tend to blow the exhaust products out of the manifold 72 to the atmosphere, again aiding the overall efficiency of the engine. It can be seen in FIG. 1 that below the X—X axis, where the constantly moving rollers 37 leave the pockets 15, the engine exhaust gases which remain after primary and secondary combustion will be expelled through the ports 69 and 70 with minimum resistance or back pressure. In all stages of rotation of the two rotors 11, the relatively stationary adjustable and lockable cam track plates 46 and their tracks 45 constantly position the piston bodies 44 in their correct radial locations on the two rotors, as seen in FIG. 1.

It should now be understood by those skilled in the art that the rotary engine simulates the well-known four stroke cycle of a piston engine, such cycle comprising intake, compression, expansion or power, and exhaust. It can be said that the overall operation of the present engine is essentially a cross or hybrid operation between a radial vane machine and a reciprocating piston machine. It embodies variable volume main and secondary combustion chambers, as explained in the description. It is characterized by simplicity, comparative light weight and overall economy. It is also clean-burning and it possesses simplified timing and adjustable fuel injection means. One of the dominant features of the engine is its minimal friction due to the use of anti-friction bearings at all critical points and, most importantly, the use of the anti-friction rollers 37 and 40. The engine is also well-balanced and symmetrical about the Y—Y axis, FIG. 1, and the rotors 11 are self-synchronizing once the engine is started. Starting may be accomplished by various conventional means, such as an air or electrical starter coupled with one of the engine shafts 25. Engine power can be taken from one shaft 25 or from both in terms of driving various accessories and for delivering power for any purpose.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A rotary internal combustion engine comprising a housing having a pair of communicating parallel axis rotor chambers, said housing having air intake passage means and engine exhaust passage means for each chamber, a pair of parallel axis rotors, one in each chamber and eccentric thereto, said rotors each having a plurality of circumferentially spaced peripheral pockets and a plurality of intervening circumferentially spaced radial passages in alignment and communicating with alternate pockets on each rotor, piston bodies movably engaged within said radial passages, vane-piston rollers carried by the outer ends of said piston bodies and adapted to enter and seat within the rotor pockets which are in communication with the radial passages and also adapted to enter the unoccupied pockets of the opposing rotor during counter-rotation of both rotors in said chambers, said vane-piston rollers intermeshing during such counter-rotation, relatively stationary cam means connected with said housing and being in engagement with inner ends of the piston bodies and displacing the piston bodies radially during counter-rotation, relatively stationary fuel injection means on said housing including one pair of injection nozzles to inject fuel into a primary combustion chamber of the engine between portions of the peripheries of said rotors and portions of the walls of said chambers and the rotating intermeshing vane-piston rollers of said rotors, said fuel injection means including a second pair of injection nozzles to inject fuel into a secondary combustion chamber of the engine formed by each pocket of each rotor and the vane-piston roller of the opposing rotor which enters each pocket and is completely engaged therein substantially on a common plane through the rotational axes of said rotors, and said housing having air-fuel induction passage means leading into said engine primary combustion chamber.

2. A rotary internal combustion engine as defined in claim 1, and means to permit circumferential adjustment and locking of the relatively stationary cam means of each rotor for timing said engine.

3. A rotary internal combustion engine as defined in claim 2, and said cam means comprising on each rotor a pair of spaced cam track plates each having a profiled cam track, a pair of anti-friction rollers on the interior end of each piston body engaged guidingly in said cam tracks, an axial shaft element carrying said cam track plates, and an adjusting dial member secured to the shaft element to turn therewith and having releasable incrementally locked engagement with a side wall of said housing, whereby incremental rotation and locking of said dial member will produce direct rotation of the cam track plates to time the engine.

4. A rotary internal combustion engine as defined in claim 1, and said relatively stationary fuel injection means comprising a block element on one side wall of said housing having bores, nozzle holders rotatably mounted in said bores, and each injection nozzle of said pairs of nozzles mounted eccentrically in one rotational holder whereby each nozzle is independently adjustable relative to the primary or secondary engine combustion chamber.

5. A rotary internal combustion engine as defined in claim 1, and each piston body having a cross shaft on its outer end, and each vane-piston roller comprising a pair of anti-friction rollers on the cross shaft and extending equidistantly beyond opposite sides of the piston body, each rotor peripheral pocket having axially spaced pocket portions receiving said anti-friction rollers on opposite sides of said radial rotor passages and piston bodies.

6. A rotary internal combustion engine as defined in claim 1, and lost motion spring means on each piston body engaged with said cam means and urging said vane-piston rollers into contact with the walls of said housing chambers.

7. A rotary internal combustion engine as defined in claim 4, and an ignition element on the engine housing side wall away from the fuel injection means for each rotor in communication with said primary and secondary engine combustion chambers.

8. A rotary internal combustion engine as defined in claim 1, and said air-fuel induction passage means comprising an induction passage common to said rotor chambers including a pair of ports opening directly into the rotor chambers at the primary combustion chambers.

9. A rotary internal combustion engine as defined in claim 8, and a carburetor on said housing communicating with said common induction passage, and an intake manifold on said housing communicating with said carburetor and having branches leading from the rotor chambers on opposite sides of said common induction passage and in advance of said primary combustion chamber and receiving air from said air intake passage means, said air intake passage means disposed approximately midway between said common induction passage and said exhaust passage means.

10. A rotary internal combustion engine as defined in claim 9, and said exhaust passage means comprising a main exhaust passage beyond said secondary combustion chamber and common to said rotor chambers, and a pair of scavenging exhaust passages on opposite sides of the main exhaust passage and communicating with the rotor chambers between the main exhaust passage and said air intake passage means.

11. A rotary internal combustion engine as defined in claim 1, and said peripheral pockets being equidistantly spaced circumferentially on said rotors and being substantially semi-cylindrical, and said vane-piston rollers being cylindrical and having close fitting engagement within said semi-cylindrical pockets during counter-rotation of the rotors.

* * * * *